United States Patent [19]

Gregor

[11] Patent Number: 5,373,217
[45] Date of Patent: Dec. 13, 1994

[54] METHOD AND CIRCUIT FOR ENHANCING STABILITY DURING DIMMING OF ELECTRODELESS HID LAMP

[75] Inventor: Philip D. Gregor, Acton, Mass.

[73] Assignee: Osram Sylvania Inc., Danvers, Mass.

[21] Appl. No.: 36,647

[22] Filed: Mar. 24, 1993

[51] Int. Cl.⁵ .................. H05B 41/16; G05F 1/00
[52] U.S. Cl. .................. 315/248; 315/291
[58] Field of Search ......... 315/248, 291, DIG. 4, 315/294, 307, 209 R, 205, 297, 312, 361, 250, 101, 106, 77, 219, 199, 39; 323/324; 377/114

[56] References Cited

U.S. PATENT DOCUMENTS

| | | | |
|---|---|---|---|
| 4,392,087 | 7/1983 | Zansky | 315/219 |
| 4,456,891 | 6/1984 | Fowks | 331/3 |
| 4,523,128 | 6/1985 | Stamm et al. | 315/291 |
| 4,894,592 | 1/1990 | Ervin et al. | 315/248 |
| 4,904,906 | 2/1990 | Atherton et al. | 315/291 |
| 4,990,789 | 2/1991 | Uesaki | 315/248 X |
| 5,004,957 | 4/1991 | Cunningham | 315/199 |
| 5,055,746 | 10/1991 | Hu et al. | 315/291 |
| 5,107,184 | 4/1992 | Hu et al. | 315/291 |
| 5,113,120 | 5/1992 | Scott et al. | 315/77 |
| 5,134,345 | 7/1992 | El-Hamamsy et al. | 315/248 |
| 5,175,476 | 12/1992 | Anderson et al. | 315/248 |
| 5,198,726 | 3/1993 | Van Meurs et al. | 315/224 |
| 5,237,264 | 8/1993 | Moseley et al. | 323/324 |
| 5,243,261 | 9/1993 | Bergervoet et al. | 315/248 |
| 5,248,918 | 9/1993 | Dakin et al. | 315/248 |
| 5,256,940 | 10/1993 | Wada et al. | 315/248 |
| 5,270,620 | 12/1993 | Basch et al. | 315/291 |
| 5,277,497 | 1/1994 | Enomoto | 377/114 |
| 5,280,217 | 1/1994 | Lapatovich et al. | 315/39 |
| 5,287,039 | 2/1994 | Gregor et al. | 315/248 |
| 5,313,144 | 5/1994 | Butler et al. | 315/248 |

*Primary Examiner*—Raymond A. Nelli
*Attorney, Agent, or Firm*—Carlo S. Bessone

[57] ABSTRACT

A method and circuit for providing stability during dimming of an electrodeless high intensity metal halide discharge lamp driven by a microwave source. Light from the lamp is rapidly dimmed to a low level in a stable manner while preventing the possibility of lamp extinction. Remote optical sensing of lamp light output is coupled with power control circuitry which modifies power delivered to the lamp based on the light response to well defined pulses of power in the output of the microwave source. Power delivered to the lamp is increased when the rate of light drop exceeds a predetermined rate and also, is controlled based on the overall light emission intensity. As a result, stable dimming is achieved regardless of the initial conditions of the discharge. The dimming method disclosed is more forgiving of light-source-system manufacturing tolerances than is presently available using absolute light intensity control alone when source output power is limited.

13 Claims, 13 Drawing Sheets

| LUMINANCE | COLOR TEMP | C.I.E. |
|---|---|---|
| 8.192e+006 FL | 4487 K | X = 0.3628 |
| 2.807e+007 Cd/M2 | 0.0037 UV | Y = 0.3726 |
| RADIANCE | 222.9 MK-1 | U' = 0.2151 |
| 1.391e+005 | OBSERVER | V' = 0.4971 |
| W/sr*m2 | 2 DEGREES | V = 0.3314 |

LAMP AT FULL POWER PRIOR TO DIMMING

*FIG. 9A*

| LUMINANCE | COLOR TEMP | C.I.E. |
|---|---|---|
| 9.390e+005 FL | 4223 K | X = 0.3719 |
| 3.217e+006 Cd/M2 | 0.0014 UV | Y = 0.3742 |
| RADIANCE | 236.8 MK-1 | U' = 0.2205 |
| 1.342e+004 | OBSERVER | V' = 0.4992 |
| W/sr*m2 | 2 DEGREES | V = 0.3328 |

LAMP AFTER 25 SECONDS OF DIM MODE OPERATION

*FIG. 9B*

| LUMINANCE | COLOR TEMP | C.I.E. |
|---|---|---|
| 9.440e+005 FL | 5591 K | X = 0.3303 |
| 3.234e+006 Cd/M2 | 0.0023 UV | Y = 0.3437 |
| RADIANCE | 178.9 MK-1 | U' = 0.2044 |
| 1.363e+004 | OBSERVER | V' = 0.4786 |
| W/sr*m2 | 2 DEGREES | V = 0.3190 |

LAMP AFTER 12 MINUTES OF DIM MODE OPERATION

*FIG. 9C*

METHOD AND CIRCUIT FOR ENHANCING STABILITY DURING DIMMING OF ELECTRODELESS HID LAMP

CROSS-REFERENCE TO A RELATED APPLICATION

This application discloses, but does not claim, inventions which are claimed in U.S. Ser. No. 07/626,365 filed Dec. 12, 1990 and assigned to the Assignee of this application.

FIELD OF THE INVENTION

This invention relates in general to electric discharge lamps and pertains, more particularly, to a means for providing stability during dimming of an electrodeless high intensity discharge (HID) lamp.

BACKGROUND OF THE INVENTION

One motivation for dimming a metal halide arc discharge lamp is to provide hot-restart-like performance. Rapid light rise to full output, from the dim level, is always possible simply by restoring full power to the lamp. The light rise time from the dim level will be a function of several factors. Firstly, the length of time the lamp has spent in the dim mode, as this affects the wall temperature thus affecting the overall energy input required for the lamp to again reach its final LTE arc stage. Secondly, the light rise time will be dependent on the cold start rise time. Lamps that take longer to reach full light output from the cold start will likewise take longer to reach full light output from the dim level. For Sodium Scandium based metal halide electrodeless discharge lamps, the light rise time from the dim level, typically 10% of the steady state light output, has never been observed to be longer than the cold start light rise time.

If an electrodeless HID lamp is fully extinguished it must cool to nearly room temperature before it can be restarted with microwave power alone. This cooling time, even for small lamps may exceed several minutes. A time period when no light is obtainable from the lamp is unacceptable in certain applications. In these instances hot restart for electroded lamps is typically achieved through application of high voltage pulses which provide electrical breakdown of the hot high pressure gas mixture within the lamp. For microwave driven electrodeless HID lamps, hot restart by conventional techniques is problematic due to the absence of electrodes.

Hot restart of electrodeless HID lamps by conventional techniques is sometimes achievable by supplying high voltage pulses to the lamp at a high frequency. When sufficient conductivity is produced within the arc tube by the pulses, the discharge may be picked up and maintained by the microwave field. Generation of such pulses and their application to compact low wattage electrodeless HID lamps may not be practicable. In such situations the present method and circuit may provide an alternative to hot restart, or at least, provide a means for dimming the lamp in a stable manner to a prescribed light level.

U.S. Ser. No. 07/626,365, filed Dec. 12, 1990, describes a method for controlled dimming of an electrodeless HID lamp to a predetermined light level at a predetermined rate. Although such a method has been successfully employed, it has been found that certain disadvantages do exist. For example, such a method has the disadvantage of requiring the user to re-adjust circuit settings for optimal performance on each individual lamp and to set the circuitry to promote lamp stability during dimming for the worst case of initial plasma conditions. Satisfying these criterion with a circuit based on a fixed light drop and decay rate often demands a compromise between optimal light response and reliable control performance.

To overcome the difficulties mentioned above, the present invention proposes a power control means for electrodeless HID lamp dimming which provides lamp stability regardless of the initial conditions of the discharge. In addition, the present invention provides a dimming means more forgiving of light-source-system manufacturing tolerances than is presently available, e.g., lamp to lamp variations as well as variations in the microwave coupling structure which applies the field to the lamp.

SUMMARY OF THE INVENTION

It is, therefore, a primary object of the present invention to provide a circuit which reliably dims an electrodeless microwave driven high intensity discharge lamp to a reproducible level while preventing the discharge from extinguishing in the process.

It is a further object of the present invention to provide hot-restart-like performance, for electrodeless HID lamp systems, in which recourse to high voltage pulse application is impractical, undesirable or presents a safety concern.

It is still another object of the invention to obviate the disadvantages of Applicant's prior application.

These objects are accomplished in one aspect of the invention by the provision of a circuit for enhancing stability during dimming of an electrodeless discharge lamp to a dim level at a predetermined rate without extinguishing. Power is applied to the lamp by a power amplifier having a terminal adapted for increasing power to the electrodeless discharge lamp in response to an input signal. In one embodiment, the circuit includes a pulse generator for generating a plurality of pulses coupled to the terminal of the power amplifier whereby each of the plurality of pulses increases power to the electrodeless lamp causing an increase in light output from the electrodeless lamp. The circuit includes means for monitoring the light output from the electrodeless discharge lamp and means for preventing extinguishing of the electrodeless discharge lamp during dimming comprising control means coupled to the terminal of the power amplifier for increasing power to the electrodeless discharge lamp.

In accordance with further teachings of the present invention, the means for preventing extinguishing of the electrodeless discharge lamp includes means coupled to the means for monitoring light output for generating a voltage proportional to each increase in light output from the electrodeless discharge lamp caused by each of the plurality of pulses. Also included is a first control circuit coupled to the terminal of the power amplifier for increasing power to the electrodeless discharge lamp when the voltage proportional to each increase in light output from the electrodeless discharge lamp caused by each of the plurality of pulses is less than a predetermined reference voltage.

In accordance with further aspects of the present invention, the means for preventing extinguishing of the electrodeless discharge lamp further includes a control circuit coupled to the terminal of the power amplifier for increasing power to the electrodeless discharge lamp when the rate of dimming from the electrodeless discharge lamp exceeds a predetermined reference rate of dimming.

In accordance with still further aspects of the present invention, the means for preventing extinguishing of the electrodeless discharge lamp further includes a control circuit coupled to the terminal means of the power amplifier means for increasing power to the electrodeless discharge lamp when the light output from the electrodeless discharge lamp is below a predetermined reference level.

Additional objects, advantages and novel features of the invention will be set forth in the description which follows, and in part will become apparent to those skilled in the art upon examination of the following or may be learned by practice of the invention. The aforementioned objects and advantages of the invention may be realized and attained by means of the instrumentalities and combination particularly pointed out in the appended claims.

BRIEF DESCRIPTION OF THE DRAWINGS

The invention will become more readily apparent from the following exemplary description in connection with the accompanying drawings, wherein:

FIG. 1b is a waveform of the light response from an electrodeless HID lamp as a result of the second stage supply voltage shown in FIG. 1a;

FIG. 9A is a table containing photometric lamp data taken at full power prior to dimming;

FIG. 9B is a table containing photometric lamp data taken at full power after 25 seconds of dim mode operation;

FIG. 9C is a table containing photometric lamp data taken at full power after 12 minutes of dim mode operation;

BEST MODE FOR CARRYING OUT THE INVENTION

Figure 1A:
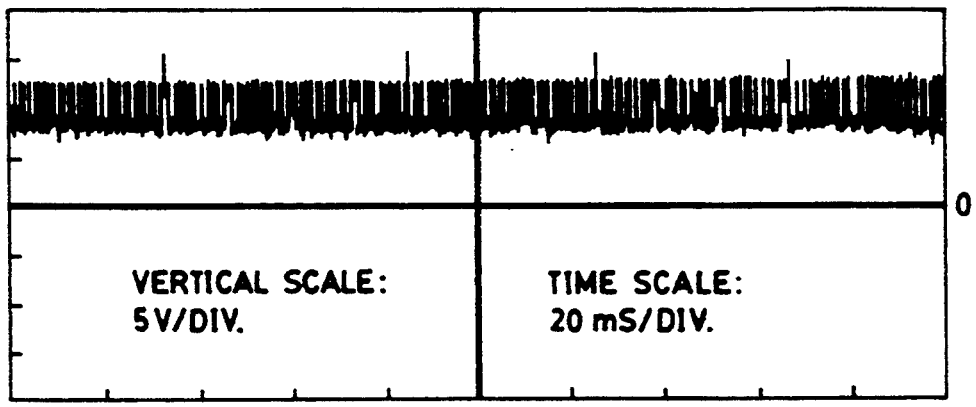
FIG. 1a is a waveform of the voltage supplied to the second stage of a microwave amplifier in accordance with the teachings of the present invention.

For a better understanding of the present invention, together with other and further objects, advantages and capabilities thereof, reference is made to the following disclosure and appended claims in connection with the above-described drawings.

Many factors affect arc discharge stability during reduced power operation of a microwave excited electrodeless metal halide lamp. These factors originate from the characteristics of the discharge itself as well as the characteristics of the microwave power source. On the discharge side, the plasma deionization time is a critical parameter which profoundly affects stability and quenching probability during reduced power operation. The deionization time of the plasma is determined by the lamp fill composition. On the microwave power source side, critical parameters affecting stability include the coupling structure, the matching network and the method used to control the power level delivered to the lamp during dimming. A variety of workable methods may be conceived of which control the source power level during dimming. The most desirable of these will include measurement of a signal which would "inform" the control circuit when discharge quenching is likely to occur in time for corrective action to be taken.

The present invention describes a method and circuit for dimming an electrodeless microwave driven high intensity discharge light source in a reliable fashion to a reproducible level using a circuit means which inhibits the lamp from extinguishing during unstable periods in the process. In the present embodiment the lamp power source utilizes a three stage microwave amplifier having isolated supplies and an output power of 25 W at 915 Mhz. During dimming, the control circuitry described herein modifies the DC voltage supplied to the second stage of the amplifier, thereby affecting the amplifier's overall gain. This then affects the power delivered to the lamp since a constant power oscillator stage is input to the amplifier. The DC voltage supplied to the amplifier's second stage is modified by the circuit in response to several "informant signals", such as, the instantaneous light output of the lamp, and the light response to short repetitive pulses of full power impressed on the lamp during dimming. As a result, quenching is averted and stability is promoted during dimming for a wide range of electrodeless lamps.

In a preferred embodiment, forward power supplied to the lamp is affected by three high gain negative feedback circuit components. The first component increases its output when the light response to the power pulses falls below a reference level. The second component increases its output when the rate of light drop exceeds a reference rate. The third component increases its output when the overall light output falls below a reference level. The component with the highest output at any given time determines the power delivered to the lamp.

The lamp power source utilizes a three stage microwave amplifier having isolated supplies and an output power of 25 W at 915 Mhz. During dimming, the control circuitry described modifies the DC voltage supplied to the second stage of the amplifier, thereby affecting the amplifier's overall gain. This then affects the power delivered to the lamp since a constant power oscillator stage is input to the amplifier. The DC voltage supplied to the amplifier's second stage is modified by the circuit in response to both the instantaneous light output of the lamp, and to the light response to short repetitive pulses of full power impressed on the lamp during dimming.

For a lamp operating at reduced power, the level of light response to a pulse of full power will indicate the ability of that lamp, at that time, to recover elevated light output in response to elevated forward power. Recovery becomes more difficult, and the likelihood that the lamp will extinguish becomes greater, at times when the light does not respond sufficiently to the power pulses.

Forward power supplied to the lamp is affected by three high gain negative feedback circuit components. The first component increases its output when the light response to the power pulses falls below a reference level. The second component increases its output when the rate of light drop exceeds a reference rate. The third component increases its output when the overall light output falls below a reference level. The component with the highest output at any given time determines the power delivered to the lamp.

The radio frequency power source may be any conventional power source capable of providing a selected frequency and power output. The preferred radio frequency source should produce a radio frequency power capable of inducing breakdown of the enclosed lamp fill, and in particular a high frequency source having a frequency from 10 Mhz. to 300 Ghz. is preferred. The range of legally allowed frequency beams may be smaller than the physically useful range, so the frequency may be further limited to the standard ISM frequencies such as from 902 Mhz. to 928 Mhz., or the ISM band centered at 2450 Mhz. The preferred frequency used for the source was 915 Mhz., as this frequency is a legally permitted choice. A suitable radio frequency source had an impedance of about 50 ohms. For reliable starting, the microwave induced electric field inside the lamp capsule should be greater than that needed to induce breakdown, which for standard lamp fills is about 150 volts per centimeter. The requirements for field breakdown may be lowered substantially by using Penning gas mixtures, or applying a bright ultraviolet light to the lamp capsule. If necessary, a radio frequency power source may be mounted on a heat sink near the lamp capsule.

The capsule encloses a lamp fill that may include various additional doping materials as is known in the art. The lamp fill composition is chosen to include at least one material that is vaporizable and excitable to emission by the radio frequency power. The lamp fill compositions useful here are in general those familiar to arc discharge tubes, most of which are felt to be applicable in the present design. The preferred gas is a Penning mix of largely neon with a small amount, less than 1%, argon, although xenon, krypton, argon or pure neon may be used. The lamp fill preferably includes a metallic compound, such as a metallic salt. Scandium iodide is a preferred metallic salt. One such lamp fill composition is 0.3 milligram of metallic mercury, 0.1 milligram of sodium-scandium iodide. Twenty torr of a Penning gas mix consisting of 0.0048% argon in neon was used in a volume of about 0.03 cm$^3$. Preferably, the lamp capsule is made of 2×3 mm quartz tubing 10 mm long and generates 3000 lumens in the steady state. Referring to the drawings, FIGS. 1a and 1b demonstrate the light response resulting from power pulses, with characteristics identical to those used in the present circuit, superimposed on a recently reduced background power level. In FIG. 1a, the voltage supplied to the second stage of the microwave amplifier is illustrated as a function of time. Sixty microsecond wide pulses at a repetition rate of 1 Khz. are superimposed on a recently reduced background voltage. Each pulse elevates the forward microwave power to its full output.

Figure 1B:
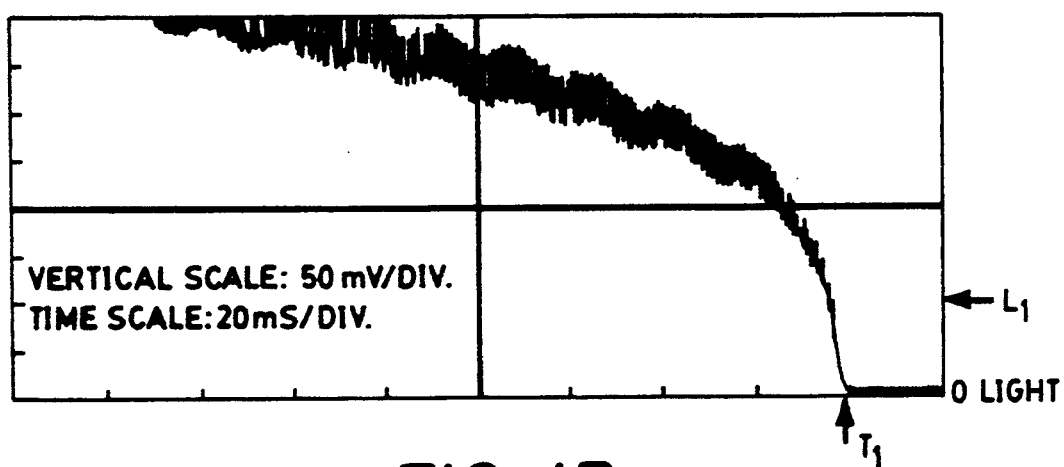

FIG. 1b illustrates the light response from the lamp as a result of the second stage supply voltage shown in FIG. 1a. The lamp in this case is purposely allowed to extinguish in order to demonstrate the decreasing light response level to the power pulses as the lamp nears the extinguishing point, indicated by the arrow at time T1 in FIG. 1b. The last light response to a power pulse is indicated by the arrow at level L1. This level corresponds to 6% of the steady state full power light output.

Figure 2A:
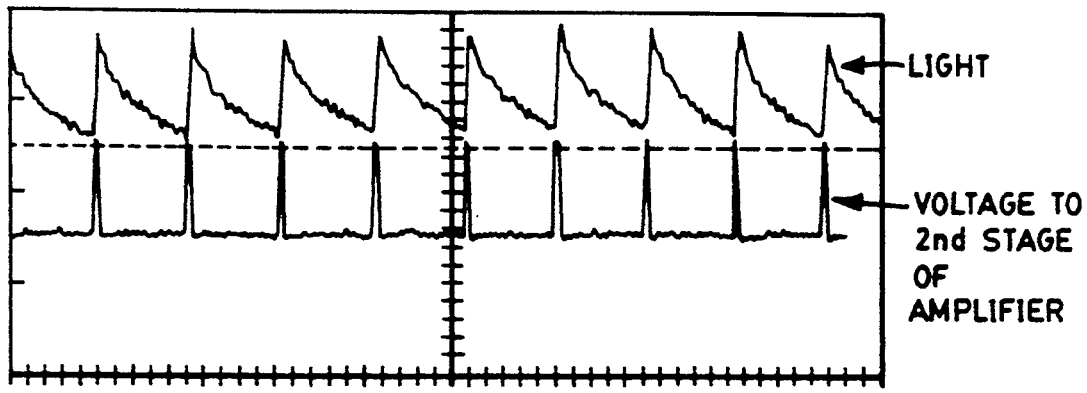
FIG. 2a are waveforms of a portion of the supply voltage and light signal shown in FIGS. 1a and 1b, respectively, displayed on an expanded time scale.

FIG. 2a shows a portion of the supply voltage and light signal shown in FIGS. 1a and 1b, respectively, displayed on an expanded time scale. The light response in this time period is relatively large indicating that the lamp is operating within a stable region. Therefore, at that point in time, power reduction may proceed without causing the lamp to extinguish.

Figure 2B:
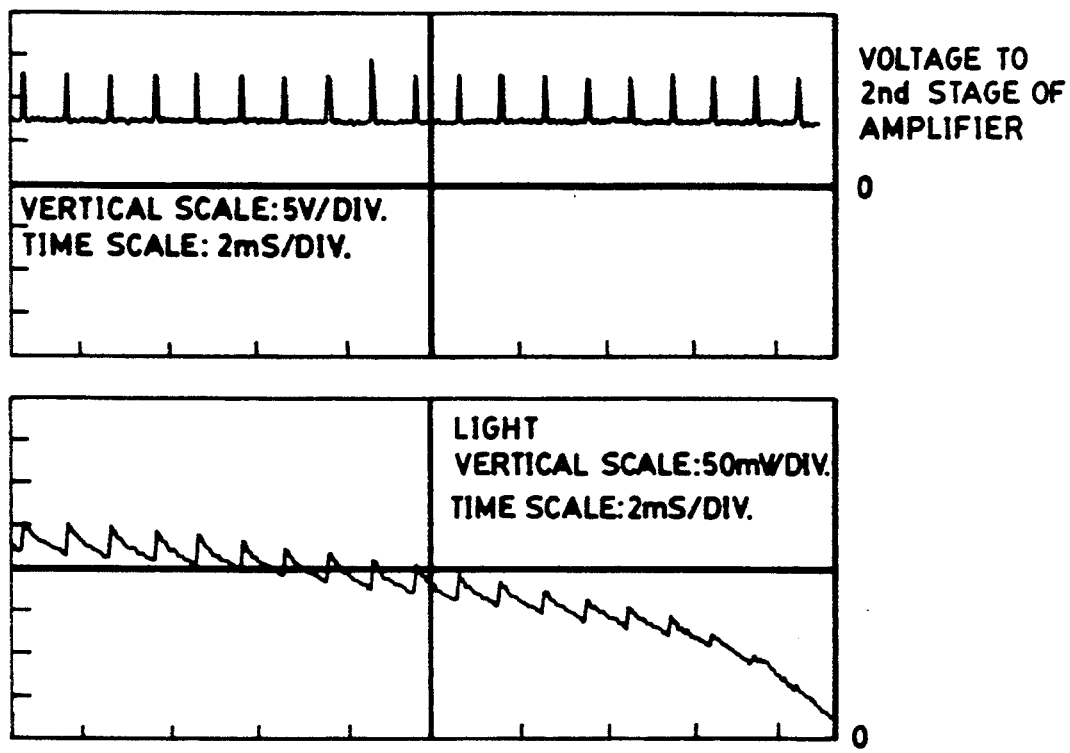
FIG. 2b are waveforms of an expanded portion of the voltage and light response signal shown in FIGS. 1a and 1b, respectively, just prior to the region where the lamp extinguishes.

The region where light drops steeply just prior to extinguishing is provided on an expanded time scale in FIG. 2b. It is clear that the response level of the light is drastically attenuated in this region.

In FIG. 2b the last detectable light response to a 60 microsecond wide pulse of full power occurs at 6% of the steady state output of the lamp. The light response level at this point is roughly 5 times less than it was just moments earlier when restoration of the light through increasing the forward power level was relatively easy indicating that the lamp was operating within a stable regime.

The light response to elevated power pulses is a valuable measure indicating when the discharge is likely to extinguish. The instantaneous light response level incorporates information relating to the plasma conditions, the balance of ionization production and loss, as well as the coupling efficiency of power into the discharge at that time, all of which directly affect the stability of the plasma. When light response to the power pulse is totally lost, it is unlikely that the discharge can be recovered.

The source of microwave power is a 915 Mhz. oscillator with constant power output followed by a Motorola three stage power amplifier. The second stage of this amplifier has a DC supply isolated from that of the first and third stages, allowing gain of the overall amplifier to be controlled by the voltage supplied to the second stage. The control circuit developed herein provides this DC supply voltage for the second stage of the amplifier. The DC supply voltage for all three amplifier stages is nominally 15 volts.

Figure 3:
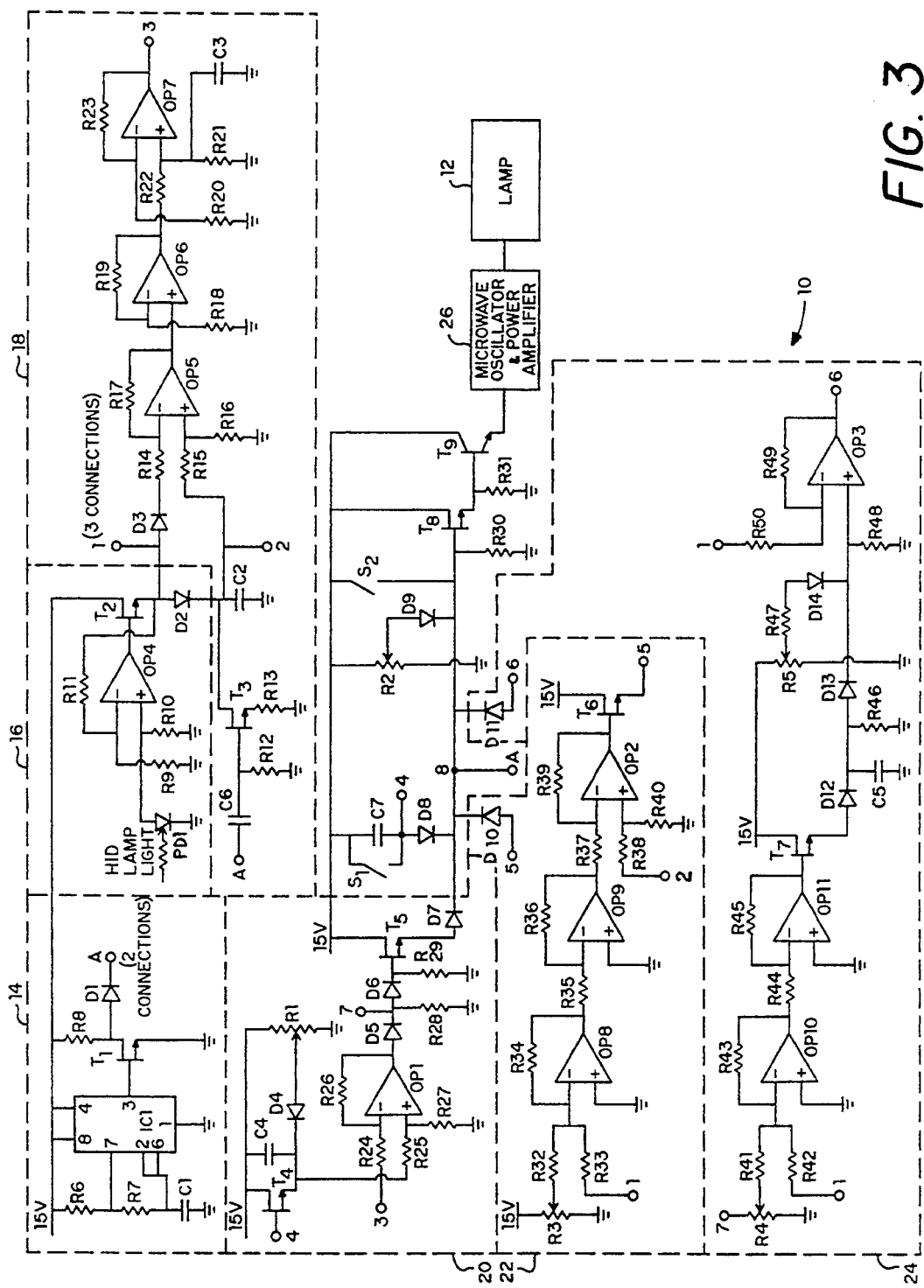
FIG. 3 is a preferred embodiment of a circuit diagram for enhancing stability during dimming of an electrodeless HID lamp in accordance with the teachings of the present invention.

Illustrated in FIG. 3, generally designated by the number 10, is the presently preferred embodiment of a circuit for enhancing stability during dimming of an electrodeless discharge lamp 12. Circuit 10 employs a pulse generator 14, a light output monitor 16, a circuit 18 for generating a voltage proportional to each increase in light output caused by each pulse from pulse generator 14, and means for preventing extinguishing of electrodeless discharge lamp 12 during dimming. In practice, the electrodeless discharge lamp is prevented from extinguishing during dimming by one or more control circuits. In a preferred embodiment, extinguishing of lamp 12 during dimming is prevented by three control circuits 20, 22 and 24. Lamp power is adjusted in response to a signal generated at the output of circuit 10 and coupled to the second stage power amplifier portion of a microwave oscillator and power amplifier 26.

In the preferred embodiment, pulse generator 14 includes a 555 timer chip IC1, resistors R6, R7 and R8, and a timer capacitor C1. The output of timer chip IC1 is connected to the gate terminal of a field effect transistor (FET) T1 having a drain connected to the junction of a resistor R8 and a diode D1. The source of transistor T1 is connected to circuit ground. As configured, pulses of full power are provided to the lamp by the voltage pulses appearing at terminal A. Preferably, the pulse repetition frequency is 1 Khz and each pulse is 60 microseconds wide. The 1 Khz pulse repetition frequency provides adequate time response to changing discharge conditions while falling below the acoustic resonance frequencies for the lamps described. It also ensures that the resultant light response will not be detected by the human eye. As will be shown, an operational amplifier OP1 operates on the change in light intensity resulting from these pulses of full power.

To monitor lamp light, a fiber optic cable (not shown) is placed approximately 8 centimeters away from lamp 12. The other end of the fiber optic cable is coupled to a photodiode PD1 constituting the input of light output monitor 16. One suitable photodiode is part no. S1336-5BQ manufactured by Hammamatzu. Light output monitor 16 includes an operational amplifier (op-amp) OP4, a transistor T2, a diode D2 and resistors R9, R10 and R11. The output signal from photodiode PD1 is connected to the non-inverting input of op-amp OP4. The inverting and non-inverting inputs of op-amp OP4 are coupled to circuit ground through resistors R9 and R10, respectively. The output of op-amp OP4 is connected to the gate of transistor T2. Resistor R11 is connected between the inverting input of OP4 and the junction of transistor T2 and diode D2. After being amplified by op-amp OP4, the amplified signal appearing at terminal 1 is utilized in three major circuit functions to be described below.

Instead of directly measuring the change in light signal on its rising portion during the power pulse, the present invention detects the level of light decay, prior to the subsequent pulse, with respect to the peak light level during the pulse.

The output of light output monitor 16 is connected to the input of a circuit 18 which generates a voltage proportional to each increase in light output from lamp 12 in response to each of the pulses generated by pulse generator 14. These pulses are subsequently applied to the lamp. Circuit 18 includes a peak detector comprising capacitors C2 and C6, a transistor T3 and resistors R12 and R13. In the present embodiment, the peak detector portion of circuit 18 is configured with one end (terminal A) of capacitor C6 connected to the cathode of diode D1 in pulse generator 14. The other end of capacitor C6 is connected to the junction of resistor R12 and the gate of transistor T3. The source of transistor T3 is coupled to circuit ground through resistor R13. The drain of transistor T3 is connected to the junction of capacitor C2 and the cathode of diode D2 (terminal 2) in light output monitor 16.

Capacitor C2 is connected through a resistor R15 to the non-inverting input of an op-amp OP5 and holds the peak light output level generated by the power pulse. The voltage held on peak detector capacitor C2 is partially discharged through transistor T3 at the beginning of each power pulse. This facilitates storage of the true peak voltage at times when the overall light signal is decreasing.

In the present configuration, a series combination of a diode D3 and a resistor R14 is connected to the inverting input of an op-amp OP5. A resistor R16 couples the non-inverting input of op-amp OP5 to circuit ground. A resistor R17 is connected between the inverting input and the output of op-amp OP5 which is connected to the non-inverting input of an op-amp OP6. The inverting input of op-amp OP6 is referenced to ground through a resistor R18. A resistor R19 is connected between the inverting input and the output of op-amp OP6. The output of op-amp OP6 is coupled through a resistor R22 to the non-inverting input of an op-amp OP7 which is coupled to circuit ground through the parallel combination of a resistor R21 and a capacitor C3. The inverting input of op-amp OP7 is referenced to ground through a resistor R20. A resistor R23 is connected between the inverting input and the output of op-amp OP7 (terminal 3).

In operation, op-amp OP4 of light output monitor 16 provides input to op-amp OP5 which is configured as a unity gain differential amplifier. The output of op-amp OP5 represents the difference developed between the real time light signal and the voltage held on the peak detector capacitor C2. The difference signal is then amplified by op-amp OP6. The output of op-amp OP6 is a signal which increases in amplitude as the light from the lamp decreases after the power pulse. The output of op-amp OP6 is then fed to the non-inverting input of op-amp OP7 which forms a differential amplifier having a ground reference attached to the inverting input through resistor R20. Capacitor C3 at the non-inverting input of op-amp OP7 holds a voltage proportional to the peak output of op-amp OP6 occurring after each power pulse. As a result, the output of op-amp OP7 (terminal 3) is a DC voltage proportional to the change in light level resulting from the power pulse. More precisely, the output signal is a DC voltage proportional to the light level decay after the pulse. This provides an accurate measure of the light response to the power pulse provided that the light response level does not change faster than capacitor C3 can charge or discharge. For this reason, capacitor C3 is chosen as small as possible while still maintaining a relatively constant output at op-amp OP7 between two successive power pulses.

The embodiment in FIG. 3 includes a first control circuit 20 comprising an op-amp OP1 having an inverting input coupled through a resistor R24 to the output of op-amp OP7 (terminal 3) in circuit 18. A reference voltage is established at the non-inverting input of op-amp OP1 by means of a transistor T4, a capacitor C4, a variable resistor R1, a diode D4 and resistors R25 and R27. In the present configuration, capacitor C4 is connected across the drain and source of transistor T4. The junction of diode D4, capacitor C4 and the source of transistor T4 is coupled through resistor R25 to the non-inverting input of op-amp OP1 which is coupled through resistor R27 to ground. The anode of diode D4 is connected to the wiper terminal of variable resistor R1. A resistor R26 is connected between the inverting input and the output of op-amp OP1.

The output of op-amp OP1 is coupled through a pair of diodes D5 and D6 to the gate of a transistor T5. The junction of diodes D5 and D6 (terminal 7) is coupled to ground through a resistor R28. The junction of the cathode of diode D6 and the gate of transistor T5 is coupled to ground through a resistor R29. The source of transistor T5 is coupled through a diode D7 to a common junction terminal 8.

In operation, op-amp OP1 increases its output voltage when the light response to the power pulses, as output from op-amp OP7, falls below the reference value found on the non-inverting input of op-amp OP1. Op-amp OP1 increases power to the lamp when its output voltage exceeds that of any other power control leg connected to the gate of a transistor T8 (junction terminal 8). The reference value for op-amp OP1 is initially high and ramps down as capacitor C4 discharges to a value determined by variable resistor R1. At its lowest level the reference voltage is set to about 0.2–0.3 Volts. The exact value is not critical but if it is set too high (several volts or more) it may be greater than the equilibrated dim level light response, thereby causing the lamp to flash unnecessarily or cycle in light level when in the dim mode.

A second control circuit 22, having an input (terminal 1) connected to the output of light output monitor 16, includes operational amplifiers OP8, OP9 and OP2. In the present configuration, the inverting input of op-amp OP8 is connected to the junction of a pair of resistors R32 and R33. The other side of resistor R32 is connected to the wiper terminal of a variable resistor R3. The output of op-amp OP8 is coupled through a resistor R35 to the inverting input of op-amp OP9. Similarly, the output of op-amp OP9 is coupled through a resistor R37 to the inverting input of op-amp OP2. The output of op-amp OP2 is connected to the gate of a transistor T6 having an output (terminal 5) coupled through a diode D10 to a common terminal junction 8. Resistors R34, R36, and R39 are connected between the inverting input and the output of op-amps OP8, OP9 and OP2, respectively. The non-inverting input of op-amp OP2 is coupled through a resistor R40 to ground and through a resistor R38 to peak detector capacitor C2 (terminal 2) of circuit 18.

In operation, second control circuit 22 functions as a light reduction rate limiter. When the light signal level at terminal 1 added to the voltage set on variable resistor R3, falls below the voltage held on capacitor C2 of circuit 18 (at terminal 2), op-amp OP2 swings its output high elevating the power applied to the lamp. This occurs when the light signal from op-amp OP4 in light output monitor 16 drops at a rate faster than the rate voltage decays on capacitor C2 as a result of discharge through transistor T3 of circuit 18.

Op-amp OP8 in circuit 22 functions as a summing amplifier and op-amp OP9 is an inverter placing a positive voltage sum on the inverting input of op-amp OP2. When the light signal at terminal 1 remains above the voltage on capacitor C2 by a voltage equal to one diode drop plus the voltage set on resistor R3, op-amp OP2 swings low and returns power control to another leg in the circuit.

Preferably, the voltage set at variable resistor R3 is approximately 0.27 volts. If this setting is set too low the lamp may not dim properly since the light drops after each pulse of power might not be permitted. If the setting is too high the lamp may extinguish during dimming.

A third control circuit 24, having an input (terminal 1) connected to the output of light output monitor 16, includes operational amplifiers OP10, OP11 and OP3. As presently configured, the inverting input of op-amp OP10 is connected to the junction of a pair of resistors R41 and R42. The other side of resistor R41 is connected to the wiper terminal of a variable resistor R4. The output of op-amp OP10 is coupled through a resistor R44 to the inverting input of op-amp OP11. The output of op-amp OP11 is connected to the gate of a transistor T7 which has an output source terminal coupled through a pair of diodes D12 and D13 to the non-inverting input of op-amp OP3. The junction of diodes D12 and D13 is conned to the parallel combination of a capacitor C5 and a resistor R46. The non-inverting input of op-amp OP3 is coupled to ground through a resistor R48. The inverting input of op-amp OP3 is coupled through a resistor R50 to the output of light output monitor 16 at terminal 1. A variable resistor R5 has a wiper terminal coupled through a series combination of a resistor R47 and a diode D14 to the non-inverting input of op-amp OP3. Resistors R43, R45, and R49 are connected between the inverting input and the output of op-amps OP10, OP11 and OP3, respectively. The output of op-amp OP3 (terminal 6) is coupled through a diode D11 to common terminal junction 8.

In operation, op-amp OP3 functions as an absolute valued light level clamp and increases power to the lamp if the light output signal from op-amp OP4 falls below the reference voltage at the non-inverting input. The reference voltage is initially high prior to dimming, when switches S1 and S2 are closed, since the light signal from op-amp OP4 is supplied to the inverting input of the summing amplifier OP10 of third control circuit 24. As the light level decreases and the voltage on capacitor C5 discharges, the reference voltage drops to a clamped level set by variable resistor R5.

Variable resistor R4 at terminal 7 is placed in the circuit to add a small quantity to the light signal detected by the adjacent op-amp OP10, at times when op-amp OP1 of first control circuit 20 swings high. This elevates the reference voltage at op-amp OP3 to a selectable value above the light signal level at the time the instability occurred. Elevating the reference control level of op-amp OP3 in this manner gives the lamp more time to come into equilibrium at a particular power level. This can sometimes reduce the severity of flickering instabilities by allowing the light to decrease gradually from an elevated level as capacitor C5 discharges. As equilibrium conditions establish at a particular power level, the light response to the power pulse will typically increase in amplitude. As this occurs, op-amp OP1 swings low and power control is typically provided thereafter by op-amp OP3.

The output of op-amp OP1 in control circuit 20 swings high at times when the light response to a power pulse is insufficient as determined by the reference level at its non-inverting input. As increased power is supplied to the lamp, increased conductivity is established. At a certain point, the light response to the power pulses will again exceed the reference level causing the output of op-amp OP1 to swing low. Immediately after this occurs, the output of op-amp OP2 in second control circuit 22 provides power to the lamp in order to limit the light drop rate. When the light level falls to the reference value on op-amp OP3 in third control circuit 24, op-amp OP-3 controls the power to the lamp. If conditions for lamp stability are unfavorable at this time the light response to the power pulse will again be insufficient thereby elevating the output of op-amp OP1 high once again.

During these stabilizing periods the lamp will flash or cycle its light output briefly. Eventually, as the lamp comes into equilibrium for that range of power, matching conditions will typically improve, light response to the power pulses will increase and future power control while in the dim mode will be carried out by op-amp OP3.

The output from control circuits 20, 22 and 24 are connected to common terminal junction 8 which serves as the input terminal to a pair of follower transistors T8 and T9. In this portion of circuit 10, a diode D8 is connected in series with the parallel combination of a capacitor C7 and switch S1. In the present configuration, a resistor R30 couples the gate of transistor T8 to ground. The base of transistor T9 is coupled to ground through a resistor R31. The emitter of transistor T9 is connected to the second stage of a three stage 915 Mhz. power amplifier 26. The wiper terminal of a variable resistor R2 is coupled through a diode D9 to the gate of transistor T8. Variable resistor R2 prevents the voltage on the gate of the follower transistor T8 from dropping below a particular level. In this manner, microwave power may never be fully cut off at any point during dim mode operation.

Light from electrodeless discharge lamp 12 is monitored by a fiber optic cable coupled to photodiode PD1 located remotely along with the rest of the control circuitry. Dimming is initiated by opening a pair of switches S1 and S2, placing circuit 10 into control. Voltage supplied to the second stage of power amplifier 26 is reduced immediately due to the voltage drops across the diodes and follower transistors at the outputs of power control circuits 20, 22 and 24. Oscillator and power amplifier 26 is impedance matched to lamp 12.

Figure 4:
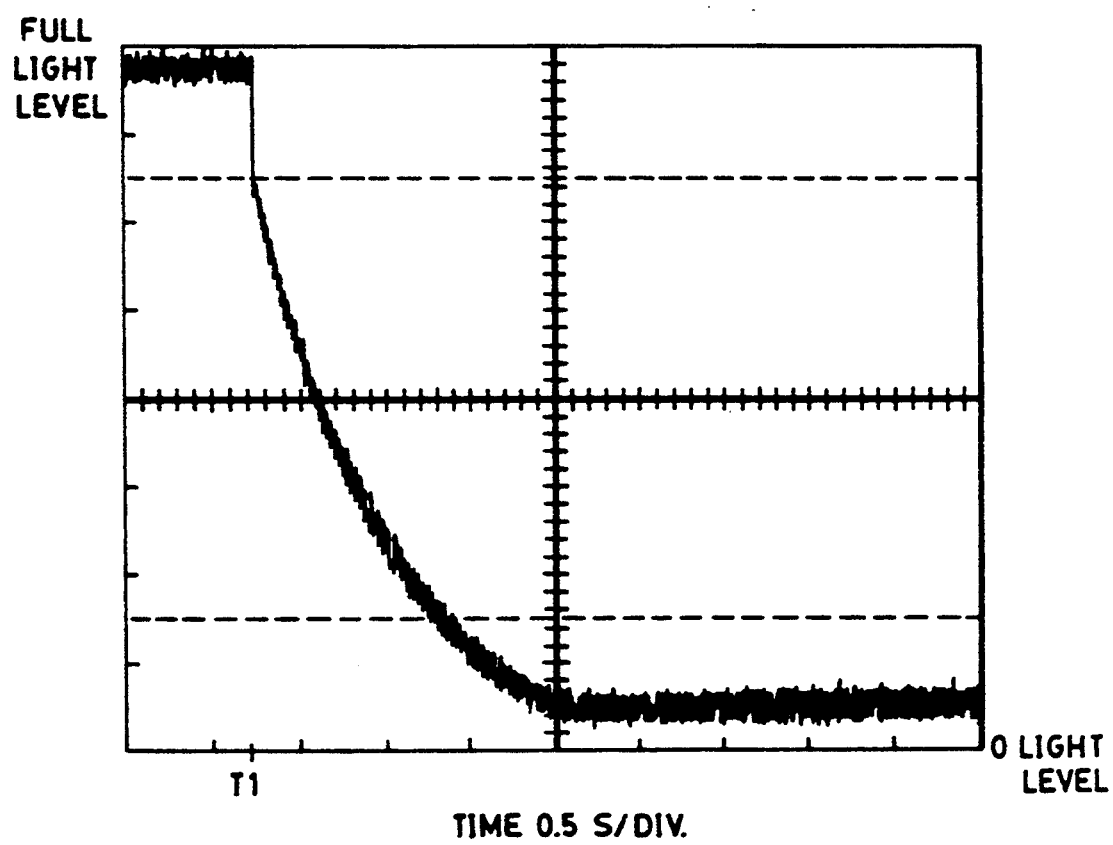
FIG. 4 is a waveform of the light during dimming for electrodeless HID lamp #1 obtained through a remote light sensor with photopic response during dimming.

FIG. 4 shows the light from electrodeless HID lamp #1, measured with an additional detector during dimming. The signal is obtained through a remote light sensor with photopic response. Switches S1 and S2 in FIG. 3 are opened at time T1. This lamp exhibits rapid stable dimming properties.

Figure 5:
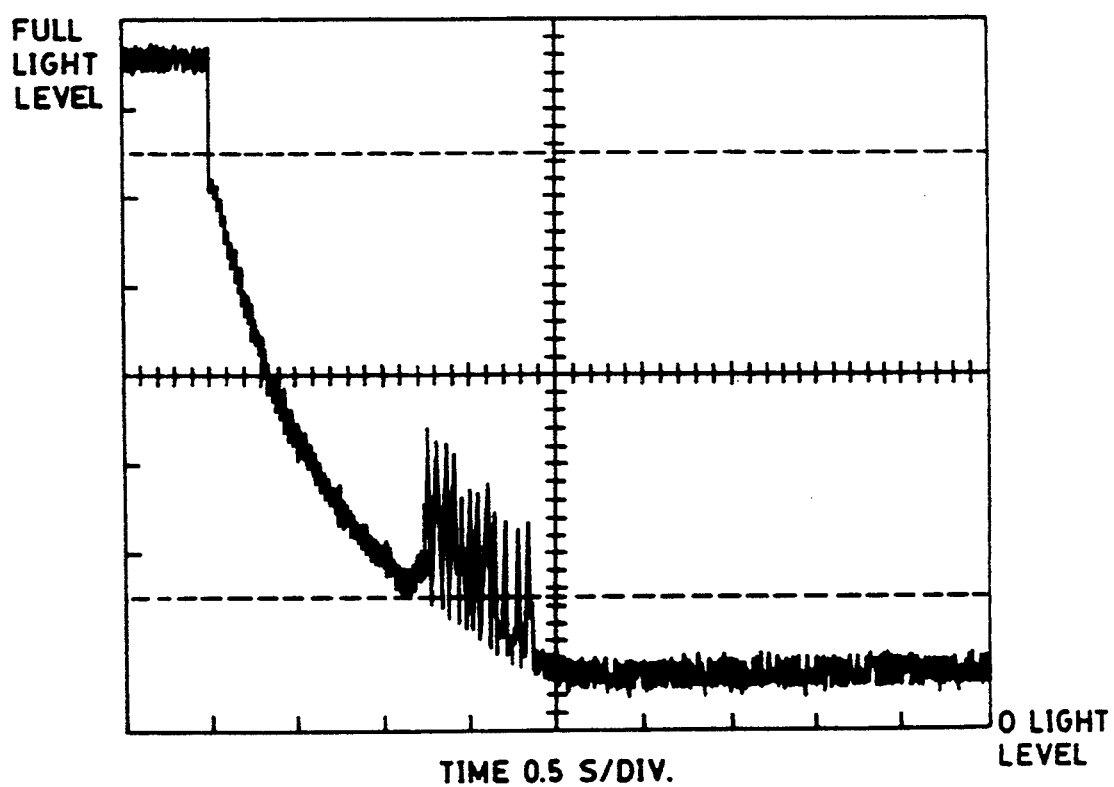
FIG. 5 is a waveform of the light from electrodeless HID lamp #2 measured in the same manner using identical control circuit setting to those used for the case shown in FIG. 4.

FIG. 5 shows the light from electrodeless HID lamp #2, measured in the same manner using identical control circuit setting to those used for the case shown in FIG. 4. HID lamp #2 is less tolerant of rapid dimming and requires a period of stabilization indicated by the light fluctuations.

FIGS. 4 and 5 demonstrate the ability of the control circuit to operate, without readjustment, on a range of lamps with properties differing to a extent larger than the expected manufacturing tolerances. Lamp #1 and lamp #2 contain vastly different fills. Lamp #1 contains over three times the mercury dose of lamp #2. The lamps are also mounted in separate coupling structures utilizing different matching networks.

Figure 6:
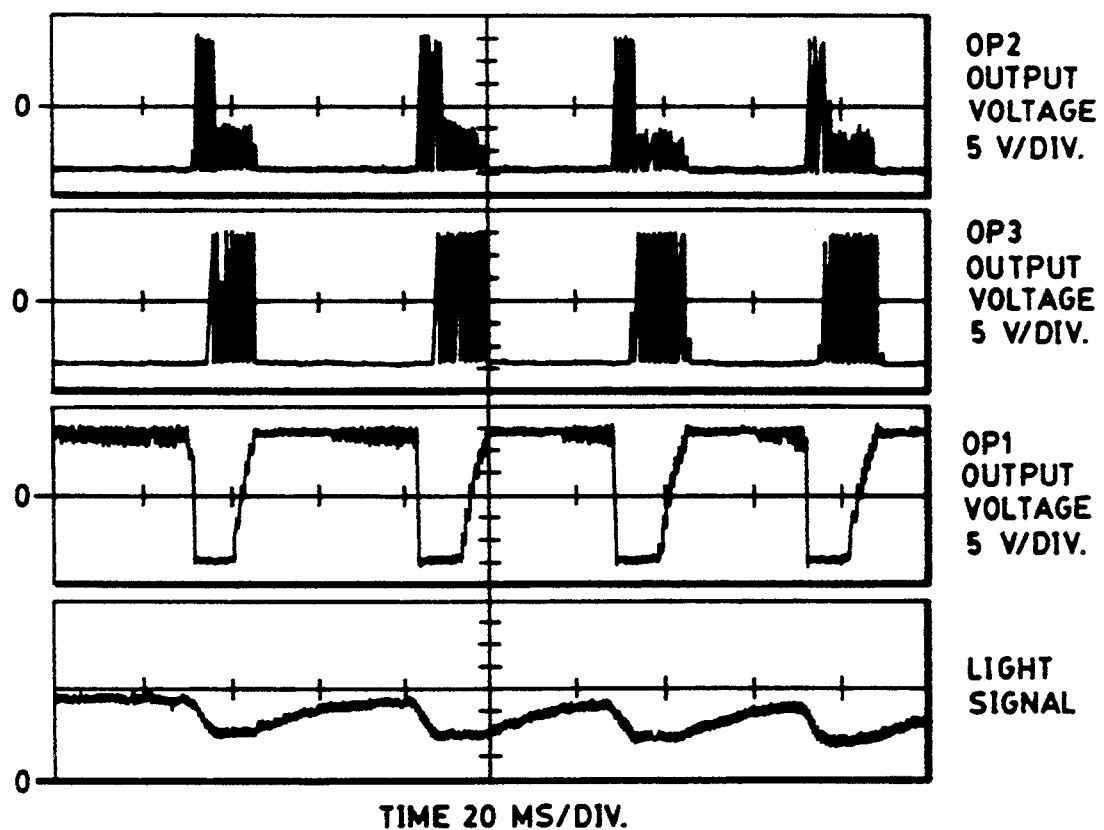
FIG. 6 are waveforms of the output voltage from operational amplifiers OP2, OP3, OP1, and from the light detector during the stabilizing region of lamp #2 in FIG. 5 where light output fluctuates.
Figure 7:
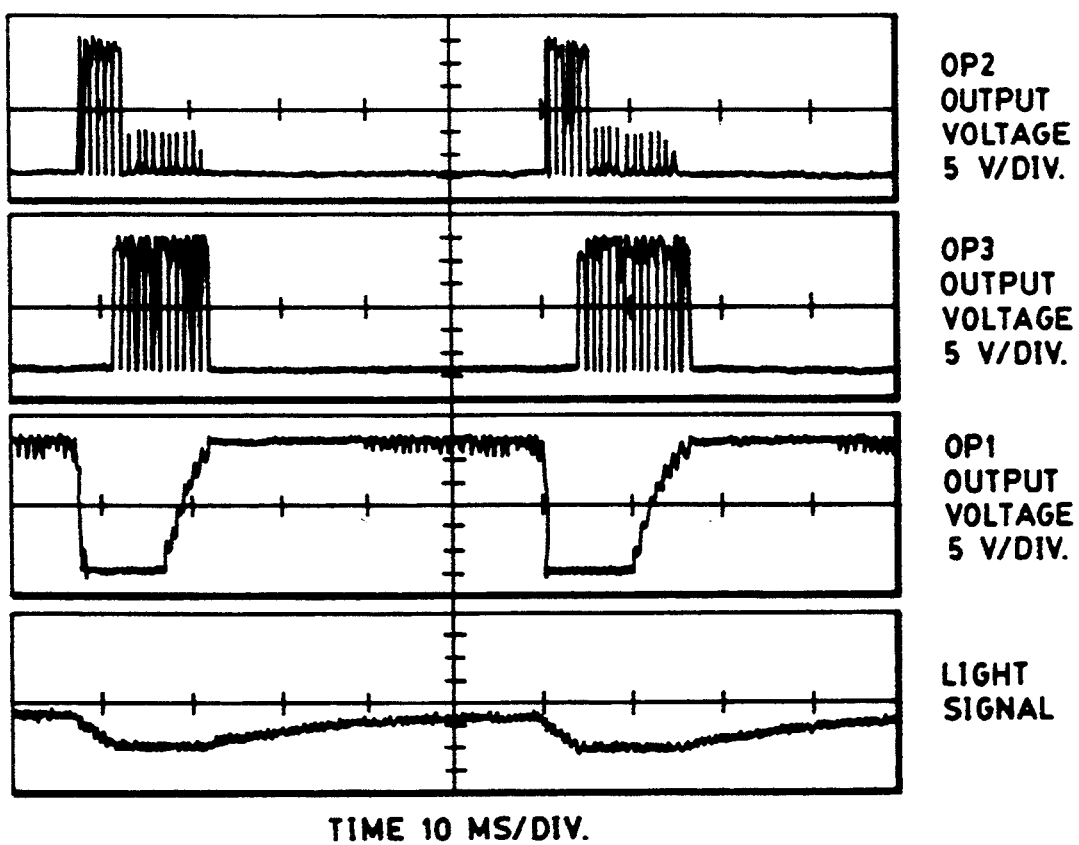
FIG. 7 are the waveforms of FIG. 6 provided on an expanded time scale in order to show the cycle of power control op-amp response during this period.

FIG. 6 provides measurements of the output voltages from operational amplifiers OP2, OP3, OP1, and from the light detector during the stabilizing region of lamp #2 in FIG. 5. These waveforms are provided on an expanded time scale in FIG. 7 in order to show the cycle of power control op-amp response during this period.

Figure 8:
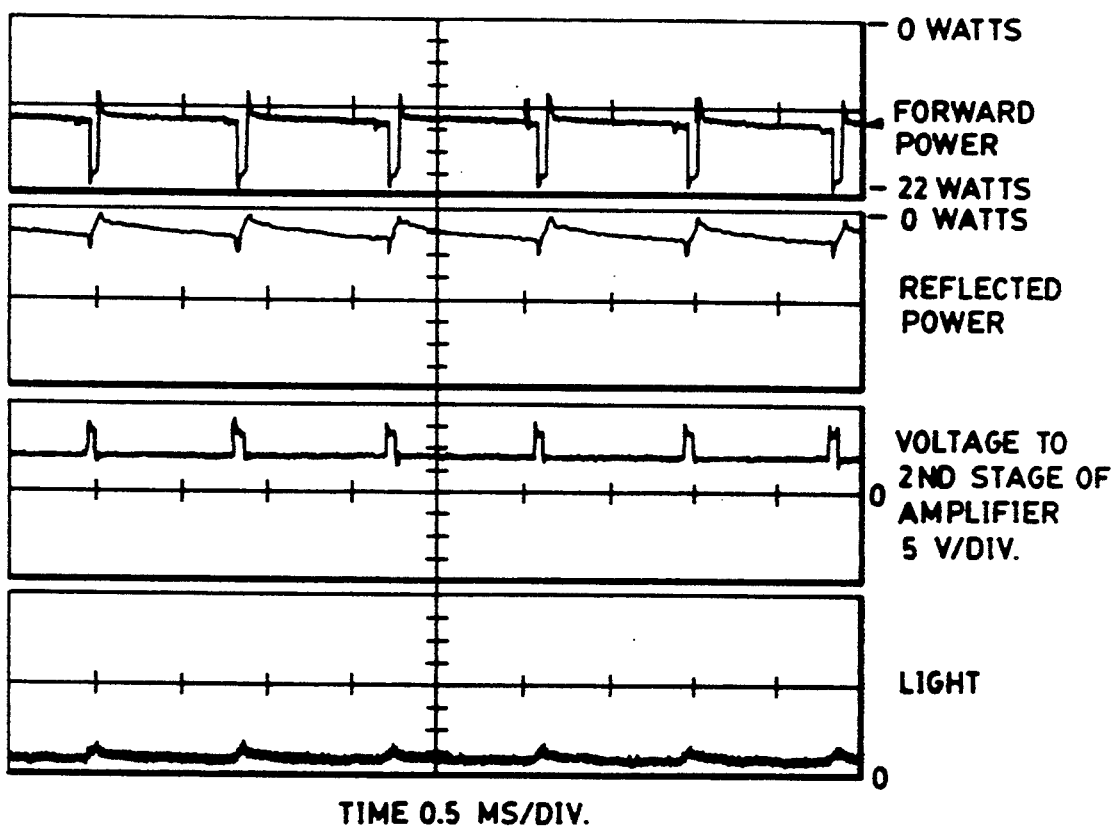
FIG. 8 are waveforms taken during the equilibrated dim mode for lamp #1 of the steady state dim mode forward microwave power, reflected microwave power, voltage supplied to the second stage of the microwave amplifier, and lamp light emission.

FIG. 8 provides measurements during the equilibrated dim mode for lamp #1 of steady state dim mode forward microwave power, reflected microwave power, voltage supplied to the second stage of the microwave amplifier, and lamp light emission. Forward and reflected microwave power are measured using Hewlett Packard model 423B crystal detectors attached to a dual directional coupler. These detectors output a negative voltage proportional to the microwave power. Therefore higher power levels on FIG. 8 are read in the negative direction, as indicted by the scale to the right of the power curves. At this stage, power control is provided by op-amp OP3 after each pulse.

The fill for lamp #1 is as follows: 0.95 mg Hg, 0.13 mg $NaScI_4$ with 1.6:1 molar ratio, and 20.2 Torr Ne-Ar Penning mix as a buffer gas. Lamp #1 was given the numerical designation 91-070 at the time of filling. The fill for lamp #2 is the following: 0.31 mg Hg, 0.11 mg $NaScI_4$ with 1.6:1 molar ratio, and 20.2 Torr Ne-Ar Penning mix. Lamp #2 was given the numerical designation 91-110 at the time of filling.

The color properties of the discharge change during dimming. Typically for the lamps observed, color temperature will shift to lower values immediately after power reduction and will then slowly shift to higher values as the wall temperature cools and mercury emission dominates. FIG. 9 are tables containing photometric lamp data for lamp 90-170 taken at full power prior to dimming, after 25 seconds of dim mode operation, and after 12 minutes of dim mode operation. Lamp 90-170 contains a fill identical to lamp #2 discussed earlier.

The lamp may be brought back to full power operation at any moment after dimming is initiated. Full power restoration is accomplished by closing switches S1 and S2 of FIG. 3. This action initiates a rapid restoration to full light output. As mentioned previously the light rise time depends upon both the length of time spent by the lamp in the dim mode and upon the fill composition.

Figure 10:
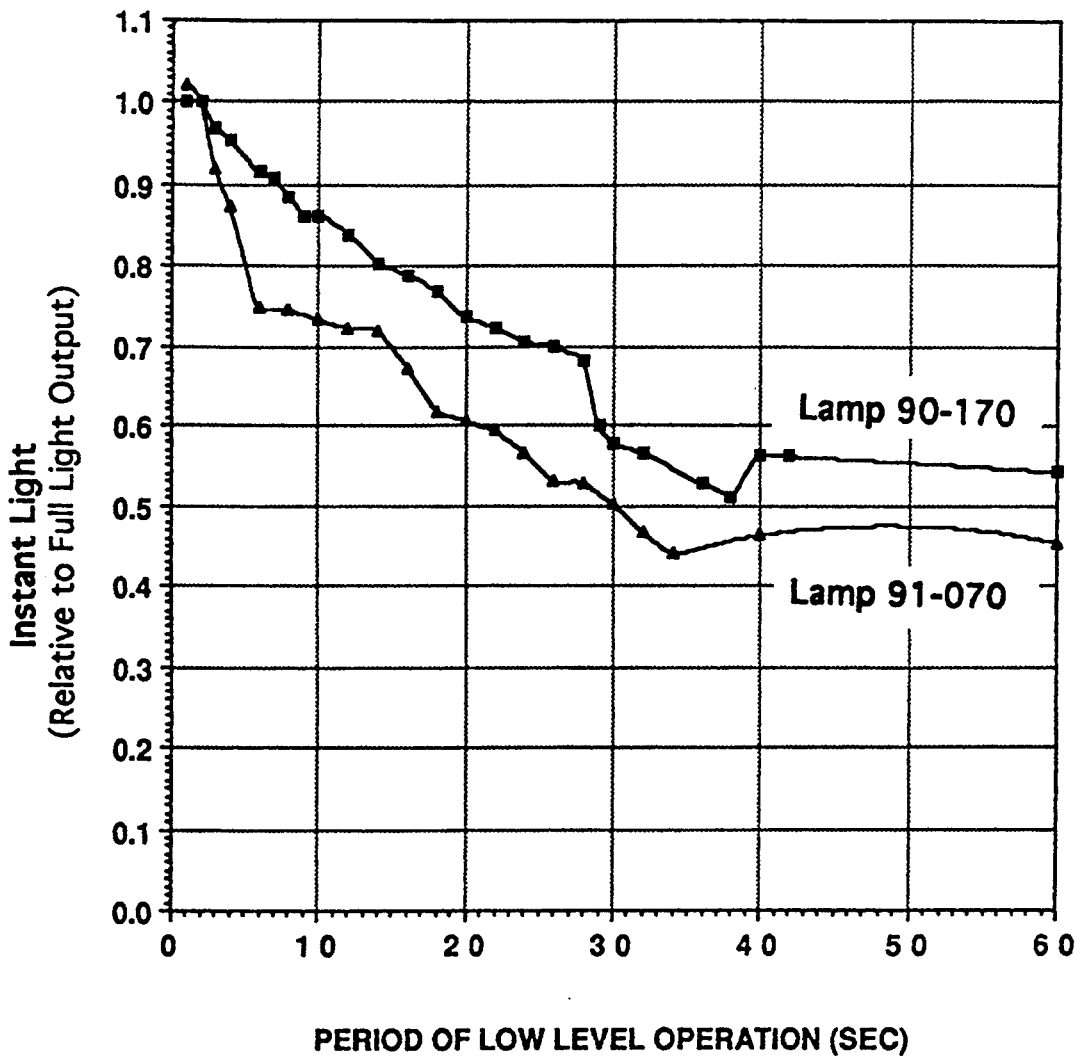
FIG. 10 is a graph illustrating instant light level upon restoration of full power, for several lamps, as a function of the time spent in the dim mode.

FIG. 10 shows the instant light level attained by several lamps as a function of time spent in the dim mode. The dim mode light level for these measurements was 10% of the steady state light level. Instant light, in this case, is defined to be the light level attained in the first 200 milliseconds after full power restoration. The instant light level attained is plotted relative to the lamp's steady state light level. The decreasing level of instant light with increasing time spent in the dim mode is a result of the arc tube wall temperature decrease with time. The wall temperature decrease reduces the vapor pressure of the volatile components and thereby reduces instant light capabilities over time.

Figure 11A:
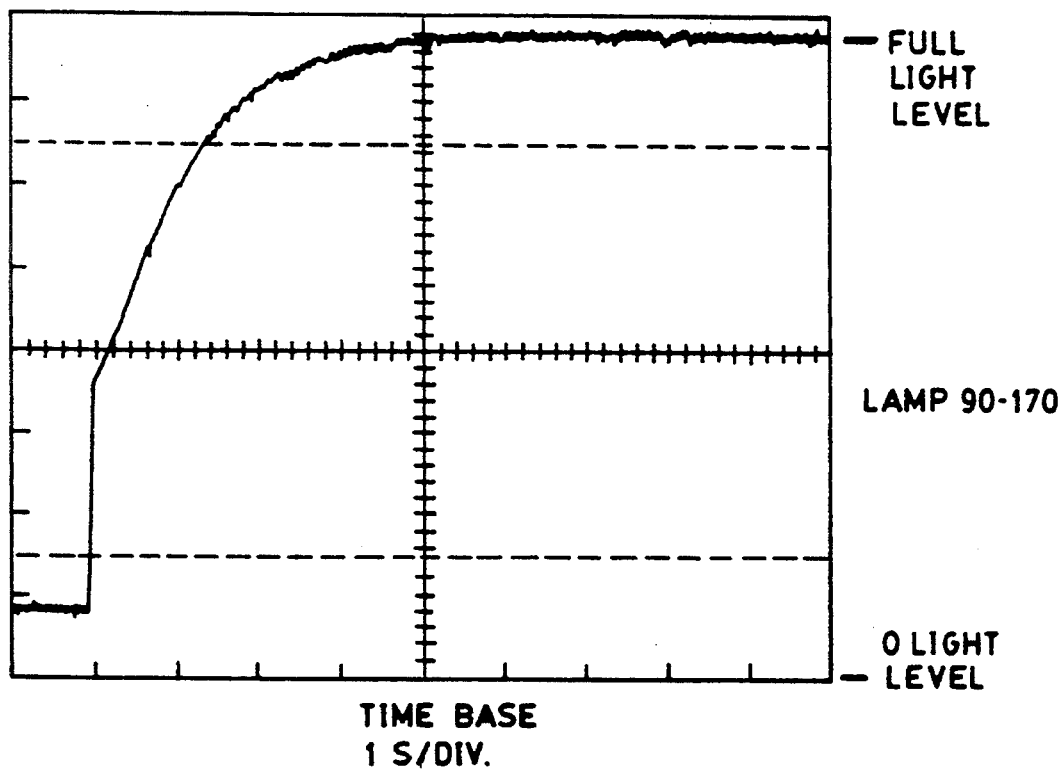
FIGS. 11a and 11b are waveforms showing the light rise from the dim level after six minutes of dim operation for lamps 90-170 and 91-070, respectively.
Figure 11B:
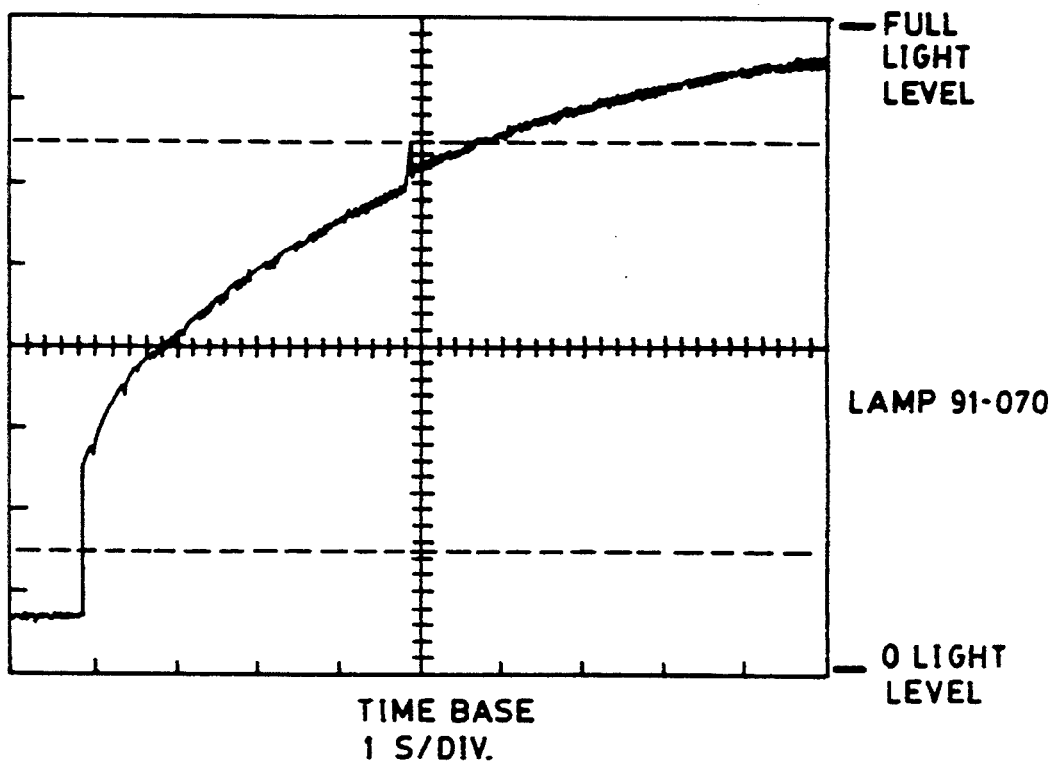

In laboratory conditions the rise times from the dim mode approach the cold start rise time (after arc constriction) after approximately five minutes of operation in the dim mode. FIGS. 11a and 11b show the light rise from the dim level after six minutes of dim operation for lamps 90-170 and 91-070, respectively. Lamp 91-070 exhibits a longer rise time perhaps as a result of its increased mercury dose. Measurements were made using a detector with photopic response.

Figure 12A:
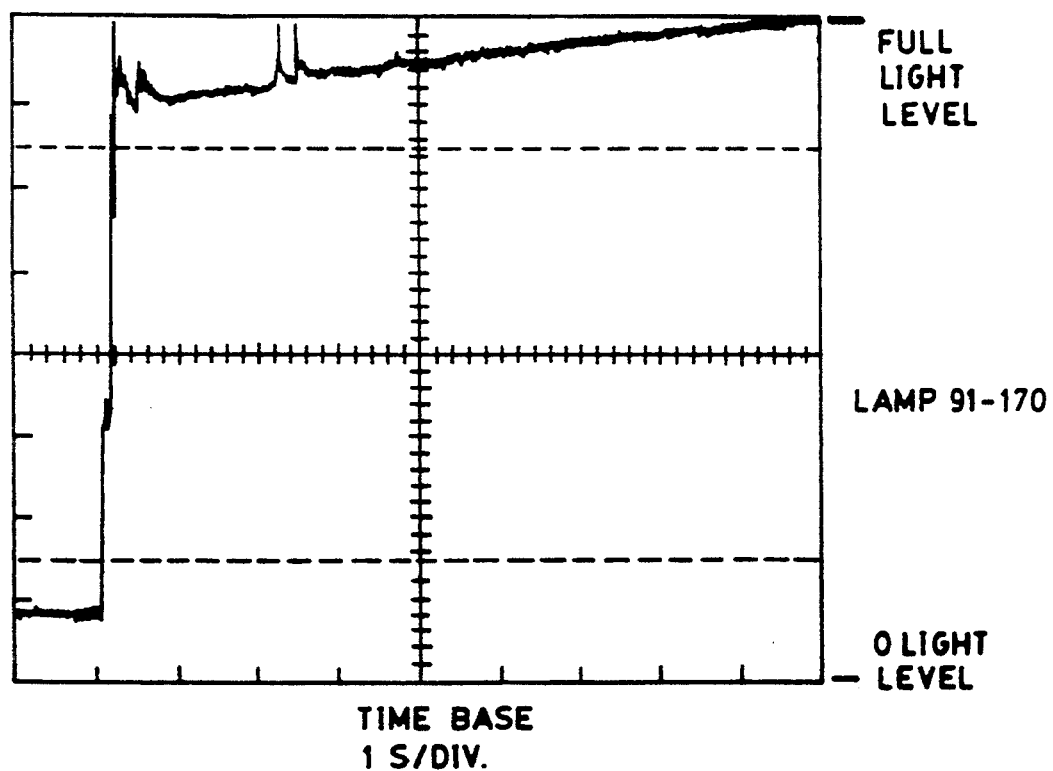
FIGS. 12a and 12b are waveforms showing light rise at power up after 10 minutes of dim mode operation on several occasions when the arc rooted itself to the salt condensate for lamp 91-070.
Figure 12B:
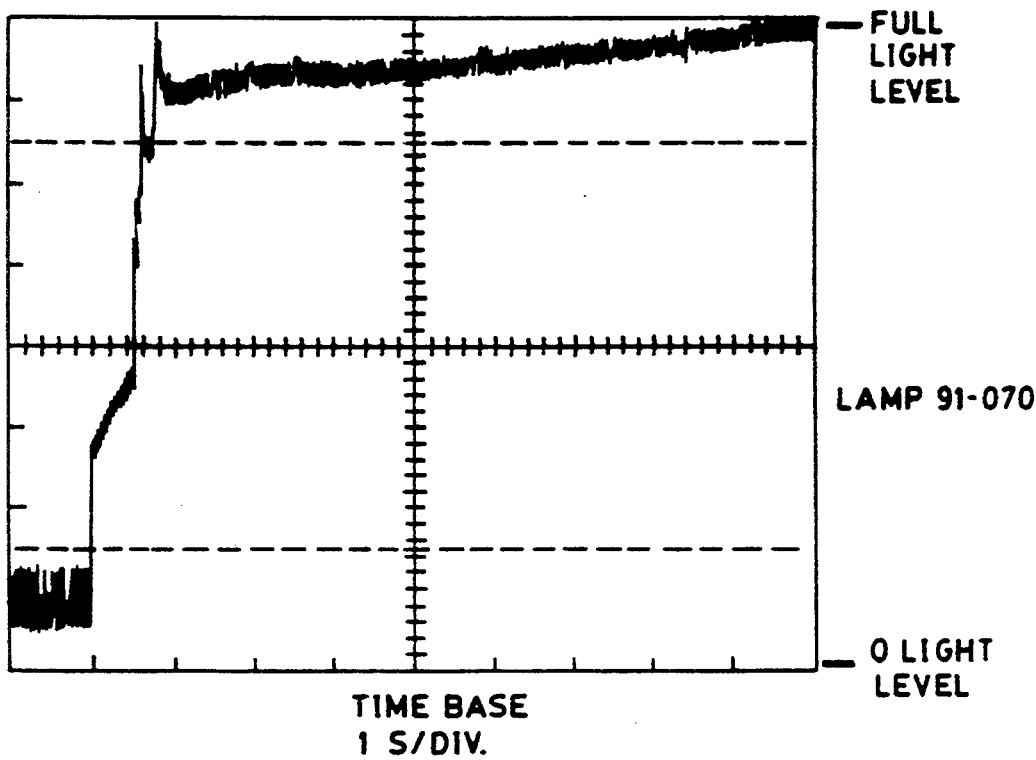

Occasionally upon restoration of full power, lamps have been observed to flash up rapidly to full light output even after extended periods of operation in the dim mode. Light has been observed to reach 85% of steady state output within a fraction of a second and continue to increase steadily, sometimes above the steady state level, as the arc capsule temperature rises. This occurs when the arc roots itself to the salt condensate at power-up thereby rapidly vaporizing it. Several examples of light output during this occurrence with lamp 91-070 are provided in FIGS. 12a and 12b.

The circuit illustrated in FIG. 3 is presented as a proof of principle design. It is in no way optimized and many improvements could be made. Understandably, those more skilled in the art of circuit design could no doubt improve the methodology in the circuit used to preferably accomplish its three main functions, those of operational amplifiers OP1, OP2, and OP3.

Gated digital sample and hold circuits could be used to detect unambiguously the level of light response on the rising portion during each power pulse. The response time of the circuit to changes in light response could be greatly improved if such techniques were used. In the current design a number of pulses pass before op-amp OP1 is able to respond to rapidly changing conditions. This is a result of the discharging time of capacitor C3 attached to the non-inverting input of op-amp OP7. If light from the lamp should suddenly fail to respond to a power pulse, time must elapse while capacitor C3 discharges and the output of op-amp OP7 drops below the reference voltage at op-amp OP1, before op-amp OP1 responds by elevating its output high thereby increasing power to the lamp.

Figure 13:
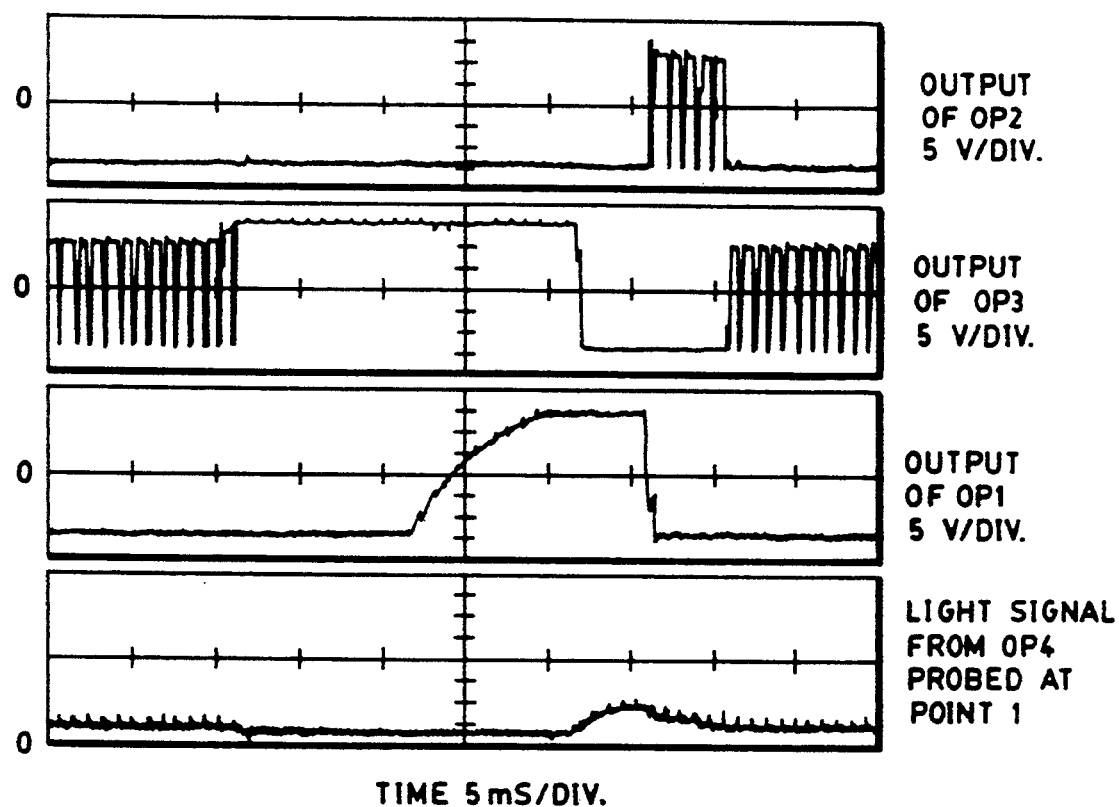
FIG. 13 are waveforms of the output of operational amplifiers OP2, OP3, OP1 and the light signal from OP4 for lamp 91-070 in dim mode.

In order to illustrate this response time, a pen was passed in front of the fiber optic cable monitoring light emission while the lamp was in its dim state. While light is blocked by the pen the circuit detects zero light, and therefore zero light response to the power pulses, and thus should elevate power through op-amp OP1. The time required for this to occur is illustrated in FIG. 13 along with the response of the other two op-amps OP2 and OP3.

When the light is blocked op-amp OP3 immediately swings steadily high sensing an overall light level below its reference point. Operational amplifier OP1 does not begin to respond until 10 milliseconds later when capacitor C3 has sufficiently discharged. By the time the pen passes from view of the fiber optic cable, light has increased above the reference point at op-amp OP3 and its output swings low. This is followed by op-amp OP1 swinging low as sufficient light response to power pulses is again detected. Overall light from the lamp now drops. The rate of the drop is limited by the output of op-amp OP2. The action of op-amp OP2 in these instances is vital to the avoidance of quenching. When the overall light decreases to the control level of op-amp OP3, its output thereafter controls power to the lamp. The response time of the present circuit does not appear to cause any performance difficulties, but if it were reduced the circuit would be capable of operating on an even wider range of lamp variations.

One subtlety exists in the circuit for its successful operation. The power level generated by the power pulses must be somewhat higher than the power level produced by a full 15 V swing of any of the power control op-amps. This is required so that sufficient light response to pulses is still be detected even at times when any one power control op-amp has swung to its full output. If this were not the case, op-amp OP1 could latch up at the full power level. The diodes and follower transistors at the outputs of operational amplifiers OP1, OP2, and OP3 develop a sufficient voltage drop prior to the pulse injection terminal A on the gate of transistor T8 in order to avoid this problem. The drawback to this is that something less than full supply output power is available for recovery of an extinguishing discharge. If the power supply could be pulsed above the steady state power level, then at least steady state power levels could be available for recovery periods. This modification could only enhance dimming performance.

Finally, the efficiency of the dimming process could be greatly improved by using a constant gain amplifier and modifying the oscillator output power in response to the control circuit output voltage. Presently the final follower transistor T9 dissipates significant power and is therefore mounted on the heat sink provided for the microwave amplifier.

During dimming, the rate of power decay is in part controlled by RC time constant decays in the reference voltages placed on operational amplifiers OP1, OP2, and OP3. It may be feasible to make the dimming rate a function of the rate of change in light response to the power pulses. This may require referencing the light response level to the overall light level in a continuous fashion. But in any case, the idea would be to have a power reduction scheme which reduced power at times when a large light response is detected, at a rate which decreased or stopped when the level of light response decreased rapidly, thereby allowing the lamp to reach an equilibrium condition for that level of power. As this equilibrium condition establishes, the light response to power pulses will again increase in amplitude indicating that further power reduction may proceed. This could be sensed by the circuit and initiate further power reduction. This type of scheme may enable lamps to be dimmed over time to extremely low light levels but the dimming rate would vary from lamp to lamp.

If stable reliable dimming to extremely low light levels is achievable utilizing such a scheme, the lamp could be dimmed to the point where it has cooled sufficiently to turn power off completely, and restart immediately thereafter, as a cold lamp, if desired. Assuming the cold start light rise time for the lamp is sufficiently rapid, this type of system could find applications in automotive forward lighting. In such a system rapid restoration to full light at any moment it is desired would be achievable thereby circumventing the hot restart problem for electrodeless headlamps.

As a specific example but in no way to be construed as a limitation, the following components are appropriate to an embodiment of the present disclosure, as illustrated by FIG. 3:

| Item | Description | Value of Part No. |
| --- | --- | --- |
| C6 | Capacitor | 680 PFD |
| C3 | Capacitor | 0.05 MFD |
| C1 | Capacitor | 0.1 MFD |
| C2,C5,C7 | Capacitors | 1 MFD |
| C4 | Capacitor | 10 MFD |
| R1 | Variable resistor | 1 Mohm |
| R2,R3 | Variable resistor | 10 Kohm |
| R4,R5 | Variable resistor | 2 Kohm |

-continued

| Item | Description | Value of Part No. |
|---|---|---|
| R13 | Resistor | 22 ohm |
| R8 | Resistor | 220 ohm |
| R11 | Resistor | 240 ohm |
| R7 | Resistor | 820 ohm |
| R18 | Resistor | 1 Kohm |
| R24–R25,R37–R38, R47,R50 | Resistors | 1.3 Kohm |
| R9–R10 | Resistors | 1.8 Kohm |
| R28 | Resistor | 2 Kohm |
| R12 | Resistor | 2.7 Kohm |
| R31–R36,R44–R45 | Resistors | 10 Kohm |
| R6 | Resistor | 12 Kohm |
| R19 | Resistor | 22 Kohm |
| R26–R27 | Resistors | 39 Kohm |
| R29–R30 | Resistors | 100 Kohm |
| R14–R17,R20–R23, R41–R43 | Resistors | 150 Kohm |
| R48–R49 | Resistors | 820 Kohm |
| R39–R40 | Resistors | 1 Mohm |
| R46 | Resistor | 2.7 Mohm |
| T1–T8 | FET Transistors | BSS 98 |
| T9 | Transistor | ECG 152 |
| D1–D14 | Diodes | ECG 125 |
| OP1–OP11 | Op-amps | LF353 |
| S1–S2 | Switches | DPST |
| PD1 | Photodiode | S1336-5BQ |

There has thus been shown and described a power control method and an apparatus for providing stability during dimming of an electrodeless high intensity metal halide discharge lamp through remote optical sensing of lamp light output coupled with power control circuitry which first, modifies power delivered to the lamp based on the light response to well defined pulses of power in the microwave source output, second, increases power delivered to the lamp when the rate of light drop exceeds a predetermined rate, and third, controls the power delivered to the lamp based on the overall light emission intensity. The aim in developing the present control means is to provide a power control method for electrodeless HID lamp dimming which provides stable dimming regardless of the initial conditions of the discharge, as well as to provide a dimming means more forgiving of light-source-system manufacturing tolerances than is presently available using absolute light intensity control alone when source output power is limited.

While there have been shown and described what are at present considered to be the preferred embodiments of the invention, it will be apparent to those skilled in the art that various changes and modifications can be made herein without departing from the scope of the invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A circuit for enhancing stability during dimming of an electrodeless discharge lamp to a dim level at a predetermined rate without extinguishing and adapted for having power applied thereto by a power amplifier means having terminal means adapted for increasing power to the electrodeless discharge lamp in response to an input signal, said circuit comprising:

pulse generator means for generating a plurality of pulses coupled to said terminal means of said power amplifier means whereby each of said plurality of pulses increases power to said electrodeless lamp causing an increase in light output from said electrodeless lamp;

means for monitoring said light output from said electrodeless discharge lamp; and means for preventing extinguishing of said electrodeless discharge lamp during dimming comprising control means coupled to said terminal means of said power amplifier means for increasing power to said electrodeless discharge lamp.

2. The circuit of claim 1 wherein said means for preventing extinguishing of said electrodeless discharge lamp includes means coupled to said means for monitoring light output for generating a voltage proportional to each increase in light output from said electrodeless discharge lamp caused by each of said plurality of pulses; and first control means coupled to said terminal means of said power amplifier means for increasing power to said electrodeless discharge lamp during dimming when said voltage proportional to each increase in light output from said electrodeless discharge lamp caused by each of said plurality of pulses is less than a predetermined reference voltage.

3. The circuit of claim 2 wherein said means for preventing extinguishing of said electrodeless discharge lamp further includes second control means coupled to said terminal means of said power amplifier means for increasing power to said electrodeless discharge lamp when the rate of dimming from said electrodeless discharge lamp exceeds a predetermined reference rate of dimming.

4. The circuit of claim 3 wherein said means for preventing extinguishing of said electrodeless discharge lamp further includes third control means coupled to said terminal means of said power amplifier means for increasing power to said electrodeless discharge lamp during dimming when the light output from said electrodeless discharge lamp is below a predetermined reference level.

5. An arrangement for enhancing stability during dimming of an electrodeless discharge lamp to a dim level at a predetermined rate without extinguishing, said arrangement comprising:

power amplifier means for applying power to an electrodeless discharge lamp, said power amplifier means having terminal means adapted for increasing power to said electrodeless discharge lamp in response to an input signal;

pulse generator means for generating a plurality of pulses coupled to said terminal means of said power amplifier means whereby each of said plurality of pulses increases power to said electrodeless lamp causing an increase in light output from said electrodeless lamp;

means for monitoring said light output from said electrodeless discharge lamp; and means for preventing extinguishing of said electrodeless discharge lamp during dimming comprising control means coupled to said terminal means of said power amplifier means for increasing power to said electrodeless discharge lamp.

6. The arrangement of claim 5 wherein said means for preventing extinguishing of said electrodeless discharge lamp during dimming includes means coupled to said means for monitoring light output for generating a voltage proportional to each increase in light output from said electrodeless discharge lamp caused by each of said plurality of pulses; and first control means coupled to said terminal means of said power amplifier means for increasing power to said electrodeless discharge lamp when said voltage proportional to each increase in light output from said electrodeless discharge lamp caused by each of said plurality of pulses is less than a predetermined reference voltage.

7. The arrangement of claim 6 wherein said means for preventing extinguishing of said electrodeless discharge lamp during dimming further includes second control means coupled to said terminal means of said power amplifier means for increasing power to said electrodeless discharge lamp when the rate of dimming from said electrodeless discharge lamp exceeds a predetermined reference rate of dimming.

8. The arrangement of claim 7 wherein said means for preventing extinguishing of said electrodeless discharge lamp during dimming further includes third control means coupled to said terminal means of said power amplifier means for increasing power to said electrodeless discharge lamp when the light output from said electrodeless discharge lamp is below a predetermined reference level.

9. An arrangement for enhancing stability during dimming of an electrodeless discharge lamp to a dim level at a predetermined rate without extinguishing, said arrangement comprising:

power amplifier means for applying power to an electrodeless discharge lamp, said power amplifier means having terminal means adapted for increasing power to said electrodeless discharge lamp in response to an input signal;

pulse generator means for generating a plurality of pulses coupled to said terminal means of said power amplifier means whereby each of said plurality of pulses increases power to said electrodeless lamp causing an increase in light output from said electrodeless lamp;

means for monitoring said light output from said electrodeless discharge lamp;

means coupled to said means for monitoring light output for generating a voltage proportional to each increase in light output from said electrodeless discharge lamp caused by each of said plurality of pulses;

first control means coupled to said terminal means of said power amplifier means for increasing power to said electrodeless discharge lamp during dimming when said voltage proportional to each increase in light output from said electrodeless discharge lamp caused by each of said plurality of pulses is less than a predetermined reference voltage;

second control means coupled to said terminal means of said power amplifier means for increasing power to said electrodeless discharge lamp during dimming when the rate of dimming from said electrodeless discharge lamp exceeds a predetermined reference rate of dimming; and third control means coupled to said terminal means of said power amplifier means for increasing power to said electrodeless discharge lamp during dimming when the light output from said electrodeless discharge lamp is below a predetermined reference level.

10. A method for enhancing stability during dimming of an electrodeless discharge lamp to a dim level at a predetermined rate without extinguishing, said method comprising the steps of:

providing a power amplifier means for applying power to an electrodeless discharge lamp, said power amplifier means having terminal means adapted for increasing power to said electrodeless discharge lamp in response to an input signal;

generating a plurality of pulses and coupling said plurality of pulses to said terminal means of said power amplifier means whereby each of said plurality of pulses increases power to said electrodeless lamp causing an increase in light output from said electrodeless lamp;

monitoring said light output from said electrodeless discharge lamp; and preventing extinguishing of said electrodeless discharge lamp during dimming by providing control means coupled to said terminal means of said power amplifier means for increasing power to said electrodeless discharge lamp.

11. The method of claim 10 further including the steps of generating a voltage proportional to each increase in light output from said electrodeless discharge lamp caused by each of said plurality of pulses, and increasing power to said electrodeless discharge lamp when said voltage proportional to each increase in light output from said electrodeless discharge lamp caused by each of said plurality of pulses is less than a predetermined reference voltage.

12. The method of claim 11 further including the step of increasing power to said electrodeless discharge lamp when the rate of dimming from said electrodeless discharge lamp exceeds a predetermined reference rate of dimming.

13. The method of claim 12 further including the step of increasing power to said electrodeless discharge lamp when the light output from said electrodeless discharge lamp is below a predetermined reference level.

* * * * *